United States Patent
Pialot et al.

(10) Patent No.: US 8,710,140 B2
(45) Date of Patent: *Apr. 29, 2014

(54) PROCESS FOR MANUFACTURING A SELF-SEALING COMPOSITION

(75) Inventors: Frederic Pialot, Moissat (FR); Damien Fombelle, Chappes (FR); Bozena Voge, Coumon d'Auvergne (FR); Jose Merino Lopez, Riom (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/057,138

(22) PCT Filed: Jul. 23, 2009

(86) PCT No.: PCT/EP2009/005344
§ 371 (c)(1),
(2), (4) Date: May 2, 2011

(87) PCT Pub. No.: WO2010/012412
PCT Pub. Date: Feb. 4, 2010

(65) Prior Publication Data
US 2011/0213050 A1 Sep. 1, 2011

(30) Foreign Application Priority Data

Aug. 1, 2008 (FR) ..................... 08 55320

(51) Int. Cl.
| | | |
|---|---|---|
| *C08J 3/20* | (2006.01) | |
| *C08J 3/22* | (2006.01) | |
| *C08L 9/00* | (2006.01) | |
| *C08L 25/02* | (2006.01) | |
| *C08K 3/00* | (2006.01) | |
| *C08K 5/00* | (2006.01) | |

(52) U.S. Cl.
CPC . *C08L 9/00* (2013.01); *C08L 25/02* (2013.01); *C08K 3/0016* (2013.01); *C08K 3/0033* (2013.01); *C08K 5/0016* (2013.01)
USPC ............................ 524/525; 523/166; 523/351

(58) Field of Classification Search
CPC ......... C08L 9/00; C08L 25/02; C08K 3/0016; C08K 3/0033; C08K 5/0016
USPC ......................... 524/462, 530, 445, 451, 525; 525/331.9, 342; 523/166, 351
See application file for complete search history.

(56) References Cited

U.S. PATENT DOCUMENTS

| | | | |
|---|---|---|---|
| 4,616,048 A | 10/1986 | Trano et al. | |
| 4,687,794 A * | 8/1987 | Huddleston et al. | 523/351 |
| 5,085,942 A * | 2/1992 | Hong et al. | 428/492 |
| 5,295,525 A * | 3/1994 | Sanda, Jr. | 152/503 |
| 5,914,364 A | 6/1999 | Cohen et al. | |
| 6,103,808 A * | 8/2000 | Hashimoto | 524/484 |
| 6,156,822 A * | 12/2000 | Materne et al. | 523/212 |
| 6,242,523 B1 * | 6/2001 | Blok et al. | 524/495 |
| 6,397,912 B1 * | 6/2002 | Watanabe et al. | 152/510 |
| 7,073,550 B2 * | 7/2006 | Reiter et al. | 152/503 |
| 2002/0115767 A1 | 8/2002 | Cruse et al. | |
| 2004/0092644 A1 * | 5/2004 | Labauze | 524/492 |
| 2004/0092648 A1 * | 5/2004 | Jones et al. | 524/502 |
| 2006/0083881 A1 * | 4/2006 | Saito et al. | 428/36.9 |
| 2007/0161735 A1 | 7/2007 | Bergman | |
| 2007/0167557 A1 * | 7/2007 | Dumke et al. | 524/495 |
| 2008/0009564 A1 * | 1/2008 | Robert et al. | 523/351 |

FOREIGN PATENT DOCUMENTS

| | | |
|---|---|---|
| EP | 0 161 201 | 11/1985 |
| FR | 2 866 028 | 8/2005 |
| FR | 2 877 348 | 5/2006 |
| WO | WO 01/85837 | 11/2001 |

OTHER PUBLICATIONS

"Plasticizers." http://greenvetpractice.com/pop-up/plasticizerpop_up. Retrieved online Dec. 18, 2012.*
Anomyme, Material Safety datasheet: Sundex 8125, XP002515554 http://recarroll.com/cw3/Assets/product_files/Sundex%208125TN.pdf>, pp. 1-5, Aug. 28, 2006.
J.C. Mitchell, "The melting point of cis-1, 4-polybutadiene", Journal of Polymer Science Part B: Polymer Letters, vol. 1, No. 6, 1963 pp. 285-288, http://dz.doi.org/10.1002/pol.1963.110.
A.V. Lesikar, "On the self-association of the normal alcohols and the glass transition in alcohol-alcohol solutions", Journal of Solution Chemistry, vol. 6, No. 2, pp. 81-93, http://dz.doi.org/10.1007/BF00643434, Feb. 1977.

* cited by examiner

*Primary Examiner* — Hannah Pak
(74) *Attorney, Agent, or Firm* — Cozen O'Connor (57) ABSTRACT

Process for manufacturing a self-sealing elastomer composition, wherein the process comprises the following steps: firstly a masterbatch comprising at least one diene elastomer and a thermoplastic plasticizing hydrocarbon resin with a content greater than 30 phr is manufactured by compounding these various components in a mixer at a temperature or up to a temperature called the "hot compounding temperature" which is above the softening point of the hydrocarbon resin; and then at least one crosslinking system is incorporated into the masterbatch thus prepared, by compounding everything, in the same mixer or in a different mixer, at a temperature or up to a maximum temperature which is kept below 100° C., in order to obtain said self-sealing composition, and wherein at least one liquid plasticizer having a glass transition temperature ($T_g$) below −20° C. is furthermore incorporated in an amount of less than 60 phr into said masterbatch or into said composition.

34 Claims, 2 Drawing Sheets

PROCESS FOR MANUFACTURING A SELF-SEALING COMPOSITION

RELATED APPLICATION

This is a U.S. National Phase Application under 35 USC 371 of International Application PCT/EP2009/005344, filed on Jul. 23, 2009.

This application claims the priority of French patent application no. 08/55320 filed Aug. 1, 2008, the entire content of which is hereby incorporated by reference.

FIELD OF THE INVENTION

The present invention relates to self-sealing compositions that can be used as puncture-resistant layers in any type of "inflatable" article, that is to say, by definition, any article that takes its useable shape when inflated with air.

The invention relates more particularly to processes for manufacturing self-sealing compositions based on a diene elastomer, such as natural rubber.

BACKGROUND OF THE INVENTION

In recent years, tire manufacturers have been making considerable efforts to develop novel solutions to a problem dating from the very first use of tired wheels of the inflatable type, namely the problem of how to allow the vehicle to continue to travel despite a considerable or complete loss of pressure of one or more tires. For decades, the spare tire was considered to be the only and universal solution. Then, more recently, the substantial advantages associated with its possible omission have become apparent. The concept of "extended mobility" was developed. The associated techniques allow the same tire to run, depending on certain limits to be respected, after a puncture or a drop in pressure. This makes it possible for example to drive to a breakdown point without having to stop, often in hazardous circumstances, to fit the spare tire.

Self-sealing compositions that allow such an objective to be achieved, and which by definition are capable of automatically ensuring, that is to say without external intervention, that a tire is sealed in the event of a perforation of the latter by a foreign body, such as a nail, are particularly difficult to develop.

To be useable, a self-sealing layer must satisfy many conditions of a physical and chemical nature. In particular, it must be effective over a very wide range of operating temperatures, and be so throughout the lifetime of the tires. It must be capable of closing off the hole when the perforating object remains in place and, when the latter is expelled, said self-sealing layer must be able to fill the hole and seal the tire.

Many solutions have admittedly been devised but they have not been able truly to be developed hitherto for vehicle tires, in particular because of difficulties in manufacturing these self-sealing compositions, and therefore because of their final cost of manufacture.

In particular, effective self-sealing compositions, based on natural rubber and on hydrocarbon resins as tackifier, have been described in the U.S. Pat. Nos. 4,913,209, 5,085,942 and U.S. Pat. No. 5,295,525. These compositions are characterized by the combined presence of a high content of hydrocarbon resin, always greater than 100 phr, and a large amount of elastomer in the liquid state, generally in the form of depolymerized natural rubber (molecular weight typically between 1000 and 100 000).

Firstly, such a high resin content, apart from the fact that it may be prejudicial to hysteresis and consequently to the rolling resistance of tires, requires particularly long and difficult kneading of the elastomeric matrix.

The use of a large amount of liquid elastomer certainly improves the fluidity of the composition, but such a use is a source of other drawbacks, especially a risk of the self-sealing composition creeping when it is used at a relatively high temperature (typically above 60° C.), as frequently encountered when certain tires are used.

If the liquid elastomer content is reduced or even if it is completely eliminated, another major manufacturing problem may then arise: in the absence of a reinforcing filler such as carbon black (which is moreover undesirable, as is known, for this type of application), the composition is not cohesive. This lack of cohesion may be such that the tack of the composition, resulting from the high content of tackifier employed, is no longer compensated for and carries it away. It then follows that there is a risk of the composition undesirably sticking on the compounding tools, which is unacceptable under industrial operating conditions.

SUMMARY OF THE INVENTION

One object of the present invention is to provide a manufacturing process which makes it possible to alleviate, or at the very least substantially reduce, the various aforementioned drawbacks.

To achieve this and other objects, one aspect of the present invention relates to a process for manufacturing a self-sealing elastomer composition, wherein said process comprises the following steps:

firstly a masterbatch comprising at least one diene elastomer and a hydrocarbon resin with a content greater than 30 phr is manufactured by compounding these various components in a mixer at a temperature or up to a temperature called the "hot compounding temperature" which is above the softening point of the hydrocarbon resin; and then at least one crosslinking system is incorporated into the masterbatch thus prepared, by compounding everything, in the same mixer or in a different mixer, at a temperature or up to a temperature which is kept below 100° C., in order to obtain said self-sealing composition, and at least one liquid plasticizer having a glass transition temperature below −20° C. is furthermore incorporated in an amount of less than 60 phr into said masterbatch or into said composition.

Such a process has proved to be particularly suitable for rapidly manufacturing, under industrially acceptable operating conditions, an effective self-sealing composition based on a diene elastomer and a hydrocarbon resin, it being possible for this composition to have high hydrocarbon resin contents without requiring the use of a liquid plasticizer with a particularly high content.

BRIEF DESCRIPTION OF THE DRAWINGS

The invention and its advantages will be readily understood in the light of the description and the following exemplary embodiments, and also FIGS. 1 and 2 relating to these embodiments that show schematically, in a simple manner, without being drawn to a specific scale:

an example of a compounding extruder that can be used to carry out a process according to the invention (FIG. 1); and in radial cross section, an example of a tire using a self-sealing composition prepared using the process according to the invention (FIG. 2).

II. DETAILED DESCRIPTION OF THE PREFERRED EMBODIMENTS OF THE INVENTION

In the present description, unless expressly indicated otherwise, all the percentages (%) indicated are % by weight.

Moreover, any range of values denoted by the expression "between a and b" represents the range of values going from more than a to less than b (i.e. with the limits a and b excluded), whereas any range of values denoted by the expression "from a to b" means the range of values going from the limit "a" up to the limit "b", i.e. including the strict limits "a" and "b".

I-1. Process of the Invention

The process according to the invention is therefore characterized in that it comprises at least the following two steps:
 a) firstly a masterbatch comprising at least one diene elastomer and a hydrocarbon resin with a content greater than 30 phr is manufactured, by compounding these various components in a mixer at a temperature or up to a temperature called the "hot compounding temperature" or "first temperature" which is above the softening point of the hydrocarbon resin; and
 b) then at least one crosslinking system is incorporated into said masterbatch, by compounding everything, in the same mixer or in a different mixer, at a temperature or up to a temperature called the "second temperature" which is kept below 100° C., in order to obtain said self-sealing composition, and in that a liquid plasticizer having a glass transition temperature (abbreviated to "$T_g$") below −20° C. is furthermore incorporated with a content of less than 60 phr (phr meaning parts by weight per hundred parts of solid rubber or elastomer) into said masterbatch and/or into said composition.

The above first and second temperatures are of course those of the masterbatch and of the self-sealing composition respectively, these being temperatures measurable in situ and not the to setpoint temperatures of the mixers themselves.

The term "masterbatch" should be understood here to mean, by definition, a compound comprising at least one diene elastomer and more than 30 phr of the hydrocarbon resin, the precursor compound for the final self-sealing composition, ready to be used.

The liquid plasticizer may be completely or partly incorporated at any moment, during any one of the steps of the process of the invention, especially during the manufacture of the masterbatch itself (in this case, before, during or after incorporation of the hydrocarbon resin into the dienene elastomer), "hot" (i.e. at a temperature above the softening point of the resin), like at a lower temperature, or for example after the manufacture of the masterbatch (in this case, before, during or after addition of the crosslinking system).

It is preferred for the liquid plasticizer to be at least partly introduced during step a) in the manufacture of the masterbatch itself, more preferably in this case either at the same time as the hydrocarbon resin or after the latter has been introduced. According to one particularly advantageous embodiment, the hydrocarbon resin and the liquid plasticizer may be blended together prior to incorporation into the diene elastomer.

Optionally, various additives may be incorporated into this masterbatch, whether these are intended for the masterbatch proper (for example a stabilizing agent, a colorant, a UV stabilizer, an antioxidant, etc.) or for the final self-sealing composition for which the masterbatch is intended.

The masterbatch may be manufactured using any compounding tool, especially in a blade mixer, a two-roll open mill, an extruder, or any mixer capable of mixing or kneading its various components sufficiently to obtain a homogeneous compound in which said components are intimately mixed. It is preferred to use a compounding screw extruder, the screw pitch of which may or may not be constant, capable of introducing, in a known manner, a large amount of shear into the compound (diene elastomer and resin) during the formation thereof.

In the initial stage, that is to say before its contact with the elastomer, the plasticizing hydrocarbon resin can be in the solid state or the liquid state. During contacting of the diene elastomer (which is solid) with the thermoplastic hydrocarbon resin, the latter may be in the solid state or, according to a more preferential embodiment, already in the liquid state. To do this, all that is required is to heat the resin to a temperature above its softening point.

Depending on the type of hydrocarbon resin used, the hot compounding temperature is typically above 70° C., preferably above 80° C., for example between 100° C. and 150° C.

For optimum compounding of the masterbatch, the hydrocarbon resin is preferably injected in the liquid state, under pressure, into the mixer. According to another preferential embodiment, whether or not combined with the previous one, the hot compounding step a) is carried out away from oxygen.

Step b) of incorporating the crosslinking system is itself carried out at a temperature or up to a maximum temperature (second temperature) which is kept below 100° C., preferably below 80° C.

According to another preferential embodiment of the invention, the second temperature is kept below the softening point of the resin. Thus, depending on the type of hydrocarbon resin used, the compounding temperature of step b) is preferably below 50° C., more preferably between 20° C. and 40° C. (for example between 20° C. and 30° C.).

If necessary, an intermediate step of cooling the masterbatch may be inserted between steps a) and b) described above, so as to bring its temperature to a value below 100° C., preferably below 80° C., especially below the softening point of the resin, this being carried out before the introduction of the crosslinking system into the masterbatch prepared beforehand.

I-2. Formulation of the Self-Sealing Composition

The self-sealing material or composition that can be prepared according to the process of the invention is therefore an elastomer composition comprising at least one diene elastomer, more than 30 phr of a hydrocarbon resin as plasticizing agent (solid at 23° C.), a liquid plasticizer with a $T_g$ below −20° C. with a content of less than 60 phr, and a crosslinking system. Apart from various optional additives, said composition may or may not include a small fraction of a reinforcing filler. Its formulation is described in greater detail below.

a) Diene Elastomer

As is known, diene elastomers may be classified in two categories: saturated and unsaturated. Here it is preferred to use diene elastomer of the unsaturated type i.e. by definition a diene elastomer obtained at least partly from conjugated diene monomers and having a content of repeat units derived from conjugated dienes which is greater than 30 mol %. Compared to diene elastomers of the liquid type, the diene elastomer of the composition of the invention is by definition solid. Typically, its number-average molecular weight ($M_n$) is between 100 000 and 5 000 000, more particularly between 200 000 and 4 000 000 g/mol.

More preferably, the (preferably unsaturated) diene elastomer is chosen from the group formed by polybutadienes (BR), natural rubber (NR), synthetic polyisoprenes (IR), butadiene copolymers (for example butadiene-stirene or SBR), isoprene copolymers and blends of such elastomers.

Even more preferably, the unsaturated diene elastomer of the composition of the invention is an isoprene elastomer, preferably chosen from the group formed by natural rubber (NR), synthetic polyisoprenes (IR), butadiene-isoprene copolymers (BIR), stirene-isoprene copolymers (SIR), stirene-butadiene-isoprene copolymers (SBIR) and blends of these elastomers. Preferably, this isoprene elastomer is natural rubber or a synthetic cis-1,4-polyisoprene.

The above unsaturated diene elastomer, especially an isoprene elastomer such as natural rubber, may constitute all of the elastomer matrix or the predominant amount by weight (preferably comprising more than 50%, even more preferably more than 70%) of said matrix when it contains one or more other, diene or non-diene, elastomers, for example of the thermoplastic type. In other words, and preferably, in the composition of the invention, the unsaturated (solid) diene elastomer content, especially isoprene elastomer such as natural rubber, is greater than 50 phr, more preferably greater than 70 phr. Even more preferably, this content of unsaturated diene elastomer, especially isoprene elastomer such as natural rubber, is greater than 80 phr.

According to one particular embodiment, the above unsaturated diene elastomer, especially when it is an isoprene diene elastomer such as natural rubber, is the sole elastomer present in the self-sealing composition of the invention. However, this isoprene elastomer could also, according to other possible embodiments, be combined with other (solid) elastomers with a minor content by weight, whether these be unsaturated diene elastomers (for example BR or SBR) or even saturated diene elastomers (for example butyl), or else elastomers other than diene elastomers, for example thermoplastic stirene (TPS) elastomers, for example chosen from the group formed by stirene/butadiene/stirene (SBS), stirene/isoprene/stirene (SIS), stirene/butadiene/isoprene/stirene (SBIS), stirene/isobutylene/stirene (SIBS), stirene/ethylene-butylene/stirene (SEBS), stirene/ethylene-propylene/stirene (SEPS), stirene/ethylene-ethylene-propylene/stirene (SEEPS) block copolymers and blends of these copolymers.

b) Hydrocarbon Resin

The term "resin" is reserved in the present application, by definition, as known to those skilled in the art, to a thermoplastic compound which is solid at room temperature (23° C.), as opposed to a liquid plasticizing compound such as an oil.

Hydrocarbon resins are polymers well known to those skilled in the art, essentially based on carbon and hydrogen, which can be used in particular as plasticizers or tackifiers in polymeric matrices. They are by nature miscible (i.e. compatible) in the contents used with the polymer compositions for which they are intended, so as to act as true diluents. They have been described for example in the work entitled "*Hydrocarbon Resins*" by R. Mildenberg, M. Zander and G. Collin (New York, VCH, 1997, ISBN 3-527-28617-9), Chapter 5 of which is devoted to their applications, especially in rubber tires (5.5. "*Rubber Tires and Mechanical Goods*"). They may be aliphatic, cycloaliphatic, aromatic, hydrogenated aromatic, or of the aliphatic/aromatic type, i.e. based on aliphatic and/or aromatic monomers. They may be natural or synthetic, whether or not based on petroleum (if such is the case, they are also known as petroleum resins).

Their glass transition temperature ($T_g$) is preferably above 0° C., especially above 20° C. (usually between 30° C. and 95° C.).

As is known, these hydrocarbon resins may also be termed thermoplastic resins in the sense that they soften when heated and may thus be moulded. They may also be defined by a softening point or temperature, at which the product, for example in powder form, becomes glutinous. This datum tends to replace the melting point, which is quite poorly defined, of resins in general. The softening point of a hydrocarbon resin is generally about 50 to 60° C. higher than the $T_g$.

In the composition of the invention, the softening point of the resin is preferably above 40° C. (in particular between 40° C. and 140° C.), more preferably above 50° C. (in particular between 50° C. and 135° C.).

Said resin is used in an amount by weight of between 30 and 90 phr. Below 30 phr, the puncture-resistance performance has proved to be insufficient because of excessive stiffness of the composition. Above 90 phr, the material may have insufficient mechanical strength with, in addition, a risk of its performance being degraded at high temperature (typically above 60° C.). For all these reasons, the resin content is preferably between 40 and 80 phr, even more preferably at least equal to 45 phr, especially in the 45 to 75 phr range.

According to a preferred embodiment of the invention, the hydrocarbon resin has at least any one of, and more preferably all, the following characteristics:
- a $T_g$ above 25° C.;
- a softening point above 50° C. (in particular between 50° C. and 135° C.);
- a number-average molecular weight ($M_n$) of between 400 and 2000 g/mol; and
- a polydispersity index ($I_p$) of less than 3 (it will be recalled that $I_p=M_w/M_n$, where $M_w$ is the weight-average molecular weight).

More preferably, this hydrocarbon resin has at least any one of, and more preferably all, the following characteristics:
- a $T_g$ of between 25° C. and 100° C. (especially between 30° C. and 90° C.);
- a softening point above 60° C., in particular between 60° C. and 135° C.;
- a number-average molecular weight $M_n$ of between 500 and 1500 g/mol; and
- a polydispersity index $I_p$ of less than 2.

The $T_g$ is measured according to the ASTM D3418 (1999) standard. The softening point is measured according to the ISO 4625 standard ("Ring and Ball" method). The macrostructure ($M_w$, $M_n$ and $I_p$) is determined by steric exclusion chromatography (SEC): tetrahydrofuran solvent; 35° C. temperature; 1 g/l concentration; 1 ml/min flow rate; solution filtered on a filter of 0.45 μm porosity before injection; Moore calibration using polystirene standards; set of three WATERS columns in series (STYRAGEL HR4E, HR1 and HR0.5); differential refractometer (WATERS 2410) detection and its associated operating software (WATERS EMPOWER).

As examples of such hydrocarbon resins, mention may be made of those chosen from the group formed by cyclopentadiene (abbreviated to CPD) or dicyclopentadiene (abbreviated to DCPD) homopolymer or copolymer resins, terpene homopolymer or copolymer resins, $C_5$-cut homopolymer or copolymer resins, $C_9$-cut homopolymer or copolymer resins and blends of these resins. Among the above copolymer resins, mention may more particularly be made of those chosen from the group formed by (D)CPD/vinylaromatic copolymer resins, (D)CPD/terpene copolymer resins, (D)CPD/$C_5$-cut copolymer resins, terpene/vinylaromatic copolymer resins, terpene/phenol resins, $C_5$-cut/vinylaromatic copolymer resins and blends of these resins. The term "terpene" includes here, as is known, alpha-pinene, beta-pinene and limonene monomers. It is preferable to use a limonene monomer, a compound which, as is known, can take the form of three possible isomers: L-limonene (laevogyratory enantiomer), D-limonene (dextrogyratory enantiomer), or else dipentene (racemic mixture of dextrogyratory and laevogyratory enantiomers). Suitable vinylaromatic monomers are for example: stirene, alpha-methylstirene, ortho-, meta- and para-methylstirene, vinyltoluene, para-tert-butylstirene, methoxystirenes, chlorostirenes, hydroxystirenes, vinylmesitylene, divinylbenzene, vinylnaphthalene and any vinylaromatic monomer derived from a $C_9$-cut (or more generally a $C_8$- to $C_{10}$-cut).

More particularly, mention may be made of resins chosen from the group formed by (D)CPD homopolymer resins, (D)CPD/stirene copolymer resins, polylimonene resins, limonene/stirene copolymer resins, limonene/D(CPD) copolymer resins, $C_5$-cut/stirene copolymer resins, $C_5$-cut/$C_9$-cut copolymer resins and blends of these resins.

All the above resins are well known to those skilled in the art and are commercially available, for example those sold by DRT under the name "Dercolyte" in the case of polylimonene resins, those sold by Neville Chemical Company under the name "Super Nevtac" or sold by Kolon under the name "Hikorez" as regards $C_5$-cut/stirene resins or $C_5$-cut/$C_9$-cut resins, or else by Struktol under the name "40 MS" or "40 NS" or by Exxon Mobil under the name "Escorez" (blends of aromatic and/or aliphatic resins).

c) Liquid plasticizer

The self-sealing composition of the invention further comprises, with a content of less than 60 phr (in other words between 0 and 60 phr), a plasticizer which is liquid at 23° C. called a "low $T_g$" plasticizer, the function of which is especially to soften the matrix by diluting the diene elastomer and the hydrocarbon resin, in particular improving the "cold" self-sealing performance (that is to say the performance typically for a temperature below 0° C.). Its $T_g$ is by definition below −20° C. and is preferably below −40° C.

Any liquid elastomer, or any oil extender, whether of aromatic or non-aromatic nature, or more generally any liquid plasticizer known for its plasticizing properties with respect to elastomers, especially diene elastomers, can be used. At ambient temperature (23° C.), these plasticizers or oils, which are relatively viscous, are liquids (that is to say, as a reminder, substances having the capability of eventually adopting the form of their container), as opposed to in particular hydrocarbon resins which by their nature are solid at room temperature.

Particularly suitable are liquid elastomers having a low number-average molecular weight ($M_n$) of typically between 300 and 90 000, more generally between 400 and 50 000, for example in the form of liquid BR, liquid SBR, liquid IR or depolymerized natural rubber, as described for example in the aforementioned patent documents U.S. Pat. Nos. 4,913,209, 5,085,942 and U.S. Pat. No. 5,295,525. Blends of such liquid elastomers with oils as described below may also be used.

Also suitable are oil extenders, especially those chosen from the group formed by polyolefin oils (i.e. those resulting from the polymerization of olefins, monoolefins or diolefins), paraffinic oils, naphthenic oils (of low or high viscosity, and hydrogenated or non-hydrogenated), aromatic or DAE (distillate aromatic extract) oils, MES (medium extracted solvate) oils, TDAE (treated distillate aromatic extract) oils, mineral oils, vegetable oils (and oligomers thereof, e.g. rapeseed, soybean or sunflower oils) and mixtures of these oils.

According to one particular embodiment, a polybutene-type oil may for example be used, in particular a polyisobutylene (PIB) oil, which has exhibited an excellent compromise of properties in comparison with the other oils tested, especially a conventional paraffinic oil. As examples, PIB oils are sold in particular by Univar under the name "Dynapak Poly" (e.g. "Dynapak Poly 190"), by BASF under the name "Glissopal" (e.g. "Glissopal 1000") or "Oppanol" (e.g. "Oppanol B12"); paraffinic oils are sold for example by Exxon under the name "Telura 618" or by Repsol under the name "Extensol 51".

Also suitable, as liquid plasticizers, are ether, ester, phosphate and sulphonate plasticizers, more particularly those chosen from esters and phosphates. As preferred phosphate plasticizers, mention may be made of those that contain between 12 and 30 carbon atoms, for example trioctyl phosphate. As preferred ester plasticizers, mention may in particular be made of compounds chosen from the group formed by trimellitates, pyromellitates, phthalates, 1,2-cyclohexane dicarboxylates, adipates, azelates, sebacates, glycerol triesters and mixtures of these compounds. Among the above triesters, mention may be made, as preferred glycerol triesters, of those that predominantly comprise (for more than 50% and more preferably for more than 80% by weight) a $C_{18}$ unsaturated fatty acid, that is to say a fatty acid chosen from the group formed by oleic acid, linoleic acid, linolenic acid and mixtures of these acids. More preferably, the fatty acid used, whether of synthetic or natural origin (for example the case of sunflower or rapeseed oils) comprises, for more than 50% by weight and even more preferably for more than 80% by weight, oleic acid. Such (trioleate) triesters having a high oleic acid content are well known—they have been described for example in patent application WO 02/088238 (or US 2004/0127617)—as plasticizing agents in tire treads.

The number-average molecular weight ($M_n$) of the liquid plasticizer is preferably between 400 and 25 000 g/mol, more preferably still between 800 and 10 000 g/mol. For excessively low $M_n$ values, there is a risk of the plasticizer migrating to the outside of the composition, whereas excessively high $M_n$ values may result in this composition becoming too stiff. An $M_n$ value between 1000 and 4000 g/mol proves to be an excellent compromise for the intended applications, in particular for use in a pneumatic tire.

The average molecular weight ($M_n$) of the plasticizer may be determined in a known manner, especially by SEC, the specimen being firstly dissolved in tetrahydrofuran with a concentration of about 1 g/l and then the solution is filtered on a filter of 0.45 porosity before injection. The apparatus is the WATERS Alliance chromatograph. The elution solvent is tetrahydrofuran, the flow rate is 1 ml/min, the temperature of the system is 35° C. and the analysis time is 30 min. A set of two WATERS columns with the trade name STYRAGEL HT6E is used. The injected volume of the polymer specimen solution is 100 µl. The detector is a WATERS 2410 differential refractometer and its associated software for handling the chromatographic data is the WATERS MILLENIUM system. The calculated average molecular weights are relative to a calibration curve obtained with polystyrene standards.

To summarize, the liquid plasticizer is preferably chosen from the group formed by liquid elastomers, polyolefin oils, naphthenic oils, paraffinic oils, DAE oils, MES oils, TDAE oils, mineral oils, vegetable oils, ether plasticizers, ester plasticizers, phosphate plasticizers, sulphonate plasticizers and mixtures of these compounds. More preferably, this liquid plasticizer is chosen from the group formed by liquid elastomers, polyolefin oils, vegetable oils and mixtures of these compounds.

A person skilled in the art will be able, in the light of the description and the embodiments that follow, to adjust the amount of liquid plasticizer according to the particular usage conditions of the self-sealing composition, especially the usage of the inflatable article in which it is intended to be used.

Preferably, the liquid plasticizer content is in the 5 to 40 phr range, more preferably in the 10 to 30 phr range. Below the indicated minima, the elastomer composition runs the risk of being too stiff for certain applications, whereas above the recommended maxima there is a risk of insufficient cohesion of the composition and of degraded self-sealing properties.

d) Crosslinking System

The self-sealing composition further includes a system for crosslinking the diene elastomer, this crosslinking system preferably being a sulphur-based crosslinking system, in other words what is called a "vulcanization" system.

Preferably, the sulphur-based vulcanization system includes, as vulcanization activator, a guanidine derivative, i.e. a substituted guanidine. Substituted guanidines are well known to those skilled in the art (see for example WO 00/05300) and non-limiting examples that may be mentioned include: N,N'-diphenylguanidine (abbreviated to DPG), triphenylguanidine or else di-o-tolylguanidine. Preferably, DPG is used.

In this vulcanization system, to obtain optimum self-sealing performance the sulphur content is preferably between 0.1 and 1.5 phr, in particular between 0.2 and 1.2 phr (for example between 0.2 and 1.0 phr) and the guanidine derivative content is itself between 0 and 1.5 phr, in particular between 0 and 1.0 phr (especially in the 0.2 to 0.5 phr range).

Said system does not require a vulcanization accelerator to be present. According to a preferred embodiment, the composition may therefore contain no such accelerator, or at the very most it may contain less than 1 phr, more preferably less than 0.5 phr, thereof. If such an accelerator is used, examples that may be mentioned include any compound (primary or secondary accelerator) capable of acting as a vulcanization accelerator for vulcanizing diene elastomers in the presence of sulphur, especially accelerators of the thiazole type and derivatives thereof, accelerators of the thiuram type, and zinc dithiocarbamates.

According to another advantageous embodiment, the above vulcanization system may contain no zinc or zinc oxide (these being known as vulcanization activators).

According to another possible embodiment of the invention, a sulphur donor may be used instead of sulphur itself. Sulphur donors are well known to those skilled in the art. Typically, the amount of such a sulphur donor will preferably be adjusted to be between 0.5 and 10 phr, more preferably between 1 and 5 phr, so as to achieve the preferred equivalent sulphur contents indicated above (namely between 0.1 and 1.5 phr, in particular between 0.2 and 1.2 phr of sulphur).

After curing, a vulcanization system as described above gives the composition sufficient cohesion, without truly vulcanizing it: the crosslinking, which can be measured using a conventional swelling method known to those skilled in the art, is in fact close to the detection threshold.

e) Filler

The composition prepared according to the process of the invention has the essential feature of being unfilled or only very lightly filled, that is to say containing from 0 to less than 30 phr of filler.

The term "filler" is understood here to mean any type of filler, whether they are reinforcing (typically nanoparticles with a weight-average size preferably of less than 500 nm, especially between 20 and 200 nm) or whether they are non-reinforcing or inert (typically microparticles with a weight-average size of greater than 1 µm, for example between 2 and 200 µm).

These fillers, whether reinforcing or not, are essentially there only to give the final composition dimensional stability, i.e. the minimum mechanical integrity required. When the filler is known to be reinforcing vis-à-vis an elastomer, especially an isoprene elastomer such as natural rubber, it is preferable to use an even smaller amount thereof in the composition.

Too high an amount, especially more than 30 phr, no longer makes it possible to achieve the minimum required flexibility, deformability and creep properties. For these reasons, the self-sealing composition preferably contains 0 to less than 20 phr, more preferably 0 to less than 10 phr, of filler.

As examples of fillers known to those skilled in the art as reinforcing fillers, mention may in particular be made of carbon black nanoparticles or a reinforcing inorganic filler, or a blend of these two types of filler.

For example, as carbon blacks, all carbon blacks, especially blacks of the HAF, ISAF and SAF types that are conventionally used in tires (these being called tire-grade blacks), are suitable. Among such blacks, the following may more particularly be mentioned: carbon blacks of the 300, 600 or 700 series (ASTM grades), such as for example the blacks N326, N330, N347, N375, N683 and N772. Suitable reinforcing inorganic fillers are especially mineral fillers of the silica ($SiO_2$) type, especially precipitated or pyrogenic silicas having a BET surface area of less than 450 $m^2/g$, preferably from 30 to 400 $m^2/g$.

As examples of fillers known to those skilled in the art as non-reinforcing or inert fillers, the following may especially be mentioned: microparticles of natural calcium carbonate (chalk) or synthetic calcium carbonate, synthetic or natural silicates (such as kaolin, talc or mica), milled silicas, titanium oxides, aluminas or even aluminosilicates. As examples of lamellar fillers, graphite particles may also be mentioned. Colouring or coloured fillers could be advantageously used to colour the composition according to the desired colour.

The physical state of the filler does not matter—it could be in the form of powder, microspheres, granules or beads, or any other suitable densified form. Of course, the term filler is also understood to mean mixtures of various reinforcing and/or non-reinforcing, fillers.

A person skilled in the art will know, in the light of the present description, how to adjust the formulation of the self-sealing composition so as to achieve the desired property levels and to adapt the formulation to the envisaged specific application.

According to one particular advantageous embodiment of the invention, if a filler is present in the composition of the invention, its content is preferably less than 5 phr (i.e. between 0 and 5 phr), in particular less than 2 phr (i.e. between 0 and 2 phr). Such contents have proved to be particularly favourable to the manufacturing process of the invention, while still providing the self-sealing composition of the invention with excellent performance. More preferably a content between 0.5 and 2 phr is used, particularly when the filler is carbon black.

When a filler such as carbon black is used, it may be introduced during step a), i.e. at the same time as the unsaturated diene elastomer and the hydrocarbon resin, or else during step b), i.e. at the same time as the crosslinking system. It has been found that a very small proportion of carbon black, preferably between 0.5 and 2 phr, further improves the compounding and the manufacture of the composition, and also its final extrudability.

f) Other Possible Additives

The base constituents described previously are sufficient in themselves for the self-sealing composition to completely fulfil its puncture-resistance function vis-à-vis the inflatable articles in which it is used. However, various other additives may be added, typically in a small amount (preferably with contents of less than 20 phr, more preferably less than 15 phr), such as for example protection agents, such as UV stabilizers, antioxidants or antiozonants, various other stabilizers, and colouring agents that can be advantageously used to colour the self-sealing composition. Apart from the elastomers described above, the self-sealing composition could also contain, again as a minor weight fraction relative to the unsaturated diene elastomer, polymers other than elastomers such as, for example, thermoplastic polymers compatible with the unsaturated diene elastomer.

II. EXEMPLARY EMBODIMENT OF THE INVENTION

II-1. Manufacture of the Self-Sealing Composition

Figure 1:
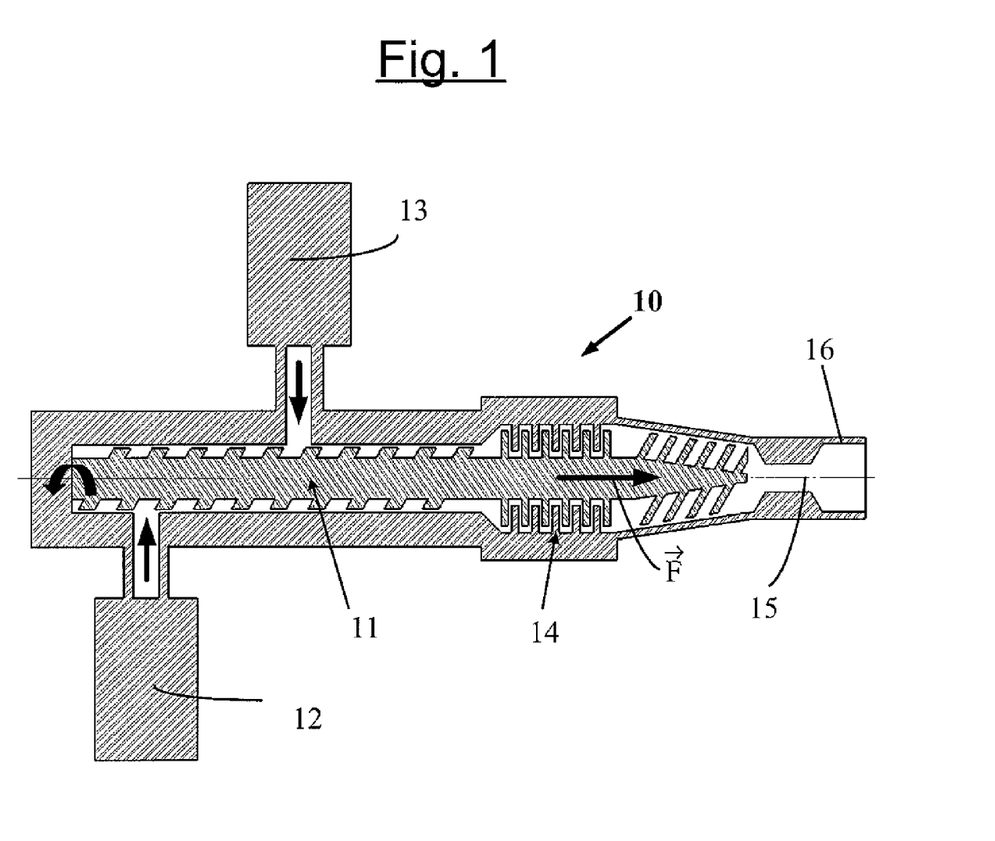

As an example, step a) in the manufacture of the materbatch is preferably carried out in a compounding screw extruder as shown schematically in FIG. 1.

FIG. 1 shows a compounding screw extruder (10) essentially comprising an extrusion screw (11) (for example a single-screw), a first metering pump (12) for the diene elastomer (solid) and at least a second metering pump (13) for the resin (solid or liquid) and the liquid plasticizer. The hydrocarbon resin and the liquid plasticizer may be introduced for example by means of a single metering pump, if they have already been mixed beforehand, or else they may be introduced separately by means of a second pump and a third pump (the third pump not being shown in FIG. 1 to simplify the drawing), respectively. The metering pumps (12, 13) are used to raise the pressure while still controlling the metering and the initial characteristics of the materials, the separation of the metering function (for the elastomer, the resin and the liquid plasticizer) from the compounding function furthermore providing better control of the process.

The products, driven by the extrusion screw, are intimately compounded under the very high shear provided by the rotation of the screw, thus progressing through the mixer, for example up to a part (14) called the "chopper-homogenizer", after which zone the final masterbatch (15) thus obtained, progressing in the direction of the arrow (F), is finally extruded through a die (16) for extruding the product to the desired dimensions.

The masterbatch thus extruded, ready to be used, is then transferred and cooled, for example on an external mixer of the two-roll open mill type for introducing the crosslinking system and the optional filler, the temperature within said external mixer being kept below 100° C., preferably below 80° C. and more preferably being below the softening point of the resin. Advantageously, the rolls of the above mill are cooled, for example by circulating water, to a temperature below 40° C., preferably to below 30° C., so as to avoid any undesirable sticking of the composition to the walls of the mixer.

It is possible for the masterbatch output by the extrusion device (10) to be formed directly, so as to make it easier to transport to and/or place in the external mixer. It is also possible for the two-roll open mill to be continuously fed.

Thanks to the preferred process and specific device as described above, it is possible to prepare a self-sealing composition under satisfactory industrial conditions without running the risk of contaminating the tools due to undesirable sticking of the composition on the walls of the mixers.

II-2. Use of the Self-Sealing Composition as Puncture-Resistant Layer

The self-sealing composition or material prepared according to the process of the invention is a solid elastic compound which is characterized in particular, thanks to its specific formulation, by a very high flexibility and deformability. It may be used as a puncture-resistant layer in any type of "inflatable" article, that is to say, by definition, any article that takes its useable form when inflated with air.

Examples of such inflatable articles that may be mentioned include inflatable boats and balloons or balls used for games or sport.

The self-sealing composition is particularly well suited to use as a puncture-resistant layer in an inflatable article, finished or semifinished product, made of rubber, particularly in tires for a motor vehicle, such as vehicles of the two-wheeled type, a passenger or industrial vehicle, or a non-automobile vehicle such as a bicycle, more particularly in tires for passenger vehicles liable to run at very high speed or tires for industrial vehicles, such as heavy-goods vehicles liable to run and operate under particularly high internal temperature conditions.

Such a puncture-resistant layer is preferably placed on the internal wall of the inflatable article, completely or at least partly covering it, but it may also be completely integrated into its internal structure.

The self-sealing composition described here has the advantage of being, over a very wide operating temperature range of the tires, practically unpenalized in terms of rolling resistance compared with a tire not having such a self-sealing layer. In comparison with the usual self-sealing compositions, it very appreciably improves the rate at which the hole is closed off, in particular when a perforating object is removed at a later stage.

Figure 2:
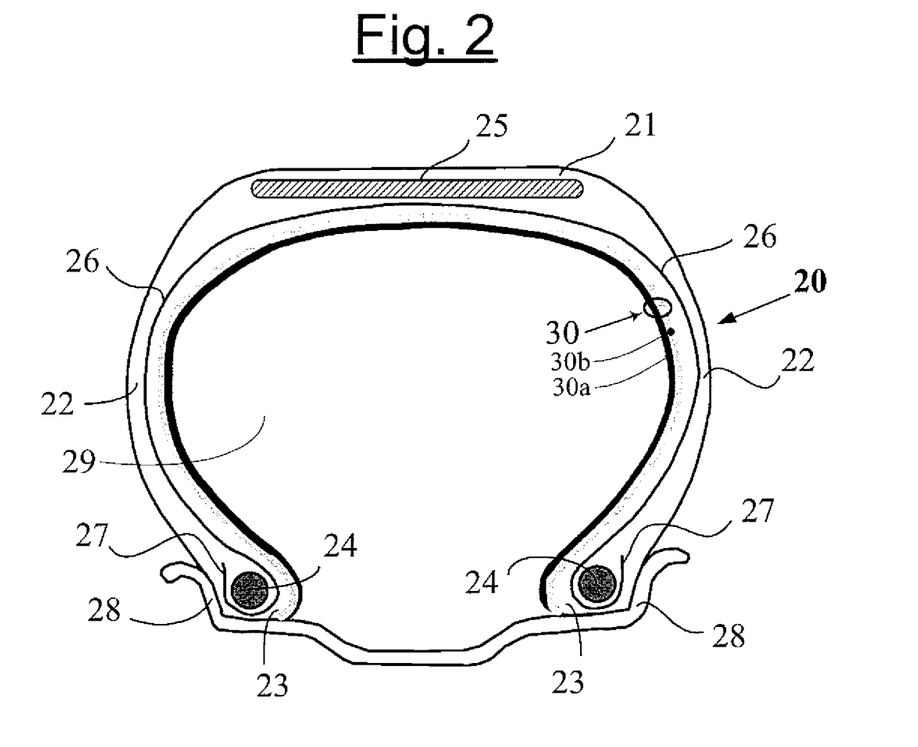

As an example, FIG. 2 appended herewith shows very schematically (without being drawn to a specific scale) a radial cross section through a tire according to the invention.

This tire 20 comprises a crown 21 reinforced by a crown reinforcement or belt 25, two sidewalls 22 and two beads 23, each of these beads 23 being reinforced with a bead wire 24.

The crown 21 is surmounted by a tread (not shown in this schematic figure). A carcass reinforcement 26 is wound around the two bead wires 24 in each bead 23, the upturn 27 of this reinforcement 26 lying for example towards the outside of the tire 20, which here is shown fitted onto its rim 28. The carcass reinforcement 26 consists, as is known per se, of at least one ply reinforced by cords, called "radial" cords, for example textile or metal cords, i.e. these cords are arranged practically parallel to one another and extend from one bead to the other so as to make an angle of between 80° and 90° with the circumferential mid-plane (the plane perpendicular to the rotation axis of the tire, which lies at mid-distance between the two beads 23 and passes through the middle of the crown reinforcement 25).

The tire 20 is characterized in that its internal wall includes a multilayer laminate (30) comprising two layers (30a, 30b), which is self-sealing thanks to its first layer (30a) and airtight thanks to its second layer (30b), for example based on butyl rubber. The two layers (30a, 30b) cover substantially the entire internal wall of the tire, extending from one sidewall to the other, at least up to level with the rim gutter when the tire is in the fitted position. The laminate here is placed in such a way that the self-sealing first layer (30a) is the radially outermost in the tire relative to the other layer (30b). In other words, the self-sealing layer (30a) covers the air-tight layer (30) on the side facing the internal cavity 29 of the tire 20.

In this example, the layer 30b (with a thickness of 0.7 to 0.8 mm) is based on butyl rubber and has a conventional formulation for an "inner liner" which usually defines, in a conventional tire, the radially internal face of said tire, intended to protect the carcass reinforcement from air diffusing from the internal space of the tire. This airtight layer 30b therefore enables the tire 20 to be inflated and to hold pressure. Its sealing properties enable it to guarantee a relatively low rate of pressure loss, enabling the tire to be kept inflated, in a normal operating state, for a sufficient duration, normally for several weeks or several months. The layer 30a itself consists of a self-sealing composition prepared in accordance with the process according to the invention, comprising the three essential constituents, namely natural rubber (100 phr), about 50 phr of a hydrocarbon resin ("Escorez 2101" from Exxon Mobil, having a softening point of about 90° C.) and about 15 phr of liquid polybutadiene ("Ricon 154" from Sartomer Cray Valley, having an $M_n$ of about 5200).

More precisely, the above self-sealing composition was prepared using a single-screw (40 L/D) extruder as shown schematically in FIG. 2 (which has already been commented upon above). The three base constituents (NR, resin and liquid plasticizer) were compounded at a temperature (between about 100 and 130° C.) above the softening point of the resin. The extruder used had two different feeds (hoppers) (one for the NR and the other for the resin and the liquid plasticizer which were mixed together beforehand at a temperature of about 130 to 140° C.) and a pressurized liquid injection pump for the resin/liquid plasticizer blend (injected at a temperature of about 100 to 110° C.). When the elastomer, the resin and the liquid plasticizer had thus been intimately compounded, it was found that the undesirable tack of the composition was very significantly reduced.

The above extruder was provided with a die for extruding the masterbatch to the desired dimensions into a two-roll open mill for the final incorporation of the other constituents, namely the vulcanization system based on sulphur (for example 0.5 or 1.2 phr) and DPG (for example 0.3 phr) and carbon black (N772, with a content of 1 phr), at low temperature kept below +30° C. (by cooling the rolls with circulating water).

The layer 30a, placed therefore between the layer 30b and the cavity 29 of the tire, gives the tire effective protection against loss of pressure due to accidental perforations, enabling these perforations to be automatically sealed off.

During trials, tires of the passenger vehicle type, of 205/55 R16 size (of the Michelin, "Energy 3" brand) were tested. The internal wall of the tires (already including the airtight layer 30b) was covered with the self-sealing layer (30a) described above, having a thickness of 3 mm, and then the tires were vulcanized.

On one of the tires, when fitted and inflated, eight perforations 5 mm in diameter were produced through the tread and the crown block on the one hand, and through the sidewalls on the other, using punches that were immediately removed.

Unexpectedly, this tire withstood being rotated at 150 km/h on a rolling drum under a nominal load of 400 kg without loss of pressure for more than 1500 km, after which distance the rolling was stopped.

On another tire, the test was carried out in the same way but this time leaving the perforating objects in place for one week. The same excellent result was obtained.

Without the self-sealing composition and under the same conditions as above, the tire thus perforated loses its pressure in less than one minute, becoming completely unsuitable for rolling.

Other endurance tests were carried out on tires according to the invention, identical to the previous tires but having been run for 750 km, at a speed of 150 km/h, this time leaving the punches in their perforations. After the punches had been removed (or after their expulsion as a result of the rolling), these tires of the invention withstood being rotated on a rolling drum without loss of pressure, under the same conditions as previously (distance traveled: 1500 km; speed: 150 km/h; nominal load: 400 kg).

The invention claimed is:

1. A process for manufacturing a self-sealing elastomer composition, wherein said process comprises the steps of:
    a) firstly a masterbatch comprising at least one diene elastomer and a hydrocarbon resin with a content greater than 30 phr is manufactured by compounding these various components in a mixer at a temperature or up to a temperature called the "hot compounding temperature" which is above the softening point of the hydrocarbon resin; and
    b) then at least one crosslinking system is incorporated into the masterbatch thus prepared, by compounding everything, in the same mixer or in a different mixer, at a temperature or up to maximum temperature which is kept below 100° C., in order to obtain said self-sealing composition, and wherein at least one liquid plasticizer having a glass transition temperature (Tg) below −20° C. is furthermore incorporated in an amount of 5 to 40 phr into said masterbatch or into said composition, wherein the liquid plasticizer is chosen from the group of liquid elastomers, polyolefinic oils, naphthenic oils, paraffinic oils, DAE oils, MES oils, TDAE oils, mineral oils, vegetable oils, ester plasticizers, phosphate plasticizers and mixtures of these compounds, and wherein the number-average molecular weight of the liquid plasticizer is between 300 and 90,000 g/mol.

2. The process according to claim 1, wherein, during the hot compounding step a), the diene elastomer is brought into contact with the hydrocarbon resin in the solid state.

3. The process according to claim 1, wherein, during the hot compounding step a), the diene elastomer is brought into contact with the hydorcarbon resin in the liquid state.

4. The process according to claim 3, wherein the hydrocarbon resin is injected in the liquid state into the mixer.

5. The process according to claim 1, wherein step a) of hot compounding the diene elastomer with the hydrocarbon resin is carried out away from oxygen.

6. The process according to claim 1, wherein the hot compounding temperature is above 70° C.

7. The process according to claim 1, wherein the hot compounding step a) is carried out in a compounding screw extruder.

8. The process according to claim 1, wherein the maximum compounding temperature of step b) is kept below 80° C.

9. The process according to claim 1, wherein the maximum compounding temperature of step b) is kept below the softening point of the hydrocarbon resin.

10. The process according to claim 1, wherein the maximum compounding temperature of step b) is kept below 50° C.

11. The process according to claim 1, wherein the compounding step b) is carried out on a two-roll open mill.

12. The process according to claim 11, wherein the rolls of the open mill are cooled to a temperature below 40° C.

13. The process according to claim 1, wherein an intermediate step of cooling the masterbatch is inserted between steps a) and b) so as to cool said masterbatch to a temperature below 100° C.

14. The process according to claim 13, wherein the temperature to which the masterbatch is cooled during said intermediate cooling step is below 80° C.

15. The process according to claim 13, wherein the temperature to which the masterbatch is cooled during said intermediate cooling step is below the softening point of the hydrocarbon resin.

16. The process according to claim 1, wherein between 0 and 30 phr of a filler is added to the composition.

17. The process according to claim 16, wherein the filler is introduced during compounding step b).

18. The process according to claim 17, wherein the filler is carbon black.

19. The process according to claim 18, wherein the carbon black content is less than 5 phr.

20. The process according to claim 19, wherein the carbon black content is between 0.5 and 2 phr.

21. The process according to claim 1, wherein the diene elastomer is chosen from the group of polybutadienes, natural rubber, synthetic polyisoprenes, butadiene copolymers, isoprene copolymers and blends of such elastomers.

22. The process according to claim 21, wherein the diene elastomer is an isoprene elastomer chosen from the group of natural rubber, synthetic polyisoprenes and blends of such elastomers.

23. The process according to claim 1, wherein the diene elastomer content is greater than 50 phr.

24. The process according to claim 22, wherein the isoprene elastomer is the sole elastomer of the composition.

25. The process according to claim 1, wherein the hydrocarbon resin content is in the 45 to 75 phr range.

26. The process according to claim 1, wherein the hydrocarbon resin has a glass transition temperature which is above 0° C.

27. The process according to claim 1, wherein the number-average molecular weight (Mn) of the hydrocarbon resin is between 400 and 2000 g/mol.

28. The process according to claim 1, wherein the hydrocarbon resin is chosen from the group of cyclopentadiene homopolymer or copolymer resins, dicyclopentadiene homopolymer or copolymer resins, terpene hompolymer or copolymer resins, C5-cut homopolymer or copolymer resins, C9-cut hompolymer or copolymer resins and blends of these resins.

29. The process according to claim 1, wherein the liquid plasticizer is incorporated into the masterbatch.

30. The process according to claim 29, wherein the liquid plasticizer is incorporated into the masterbatch at the same time as the hydrocarbon resin.

31. The process according to claim 1, wherein the liquid plasticizer is chosen from the group of liquid elastomers, polyolefinic oils, vegetable oils and mixtures of these compounds.

32. The process according to claim 1, wherein the crosslinking system is a vulcanization system based on sulphur and optionally a guanidine derivative.

33. The process according to claim 32, wherein the guanidine derivative is diphenylguanidine.

34. The process according to claim 32, wherein the vulcanization system comprises between 0.1 and 1.5 phr of sulphur and between 0 and 1.5 phr of guanidine derivative.

* * * * *